United States Patent
Francois et al.

(10) Patent No.: US 12,556,711 B2
(45) Date of Patent: Feb. 17, 2026

(54) CROSS-COMPONENT DEPTH-LUMA CODING

(71) Applicant: InterDigital CE Patent Holdings, SAS, Paris (FR)

(72) Inventors: Edouard Francois, Bourg des Comptes (FR); Gagan Bihari Rath, Rennes (FR); Karam Naser, Mouazé (FR); Tangi Poirier, Thorigné-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 12 days.

(21) Appl. No.: 18/698,809

(22) PCT Filed: Oct. 5, 2022

(86) PCT No.: PCT/EP2022/077679
§ 371 (c)(1),
(2) Date: Apr. 5, 2024

(87) PCT Pub. No.: WO2023/057501
PCT Pub. Date: Apr. 13, 2023

(65) Prior Publication Data
US 2024/0414346 A1 Dec. 12, 2024

(30) Foreign Application Priority Data
Oct. 5, 2021 (EP) .................................. 21306388

(51) Int. Cl.
*H04N 19/132* (2014.01)
*H04N 19/169* (2014.01)
(Continued)

(52) U.S. Cl.
CPC ......... *H04N 19/132* (2014.11); *H04N 19/176* (2014.11); *H04N 19/186* (2014.11); *H04N 19/1883* (2014.11)

(58) Field of Classification Search
CPC .. H04N 19/132; H04N 19/176; H04N 19/186; H04N 19/1883
(Continued)

(56) References Cited

U.S. PATENT DOCUMENTS

2014/0009574 A1   1/2014   Hannuksela et al.

OTHER PUBLICATIONS

Bross et al., "Versatile Video Coding (Draft 7)", JVET-P2001-V9, Editors, Joint Video Experts Team (JVET) of ITU-T SG 16 WP 3 and ISO/IEC JTC 1/SC 29/WG 11, 16th Meeting: Geneva, CH, Oct. 1-11, 2019, 491 pages.
(Continued)

*Primary Examiner* — Nguyen T Truong
(74) *Attorney, Agent, or Firm* — Condo Roccia Koptiw LLP

(57) ABSTRACT

Systems, methods, and instrumentalities are disclosed for cross-component depth-luma coding. Depth information may be used as information for joint or cross-component coding of texture information (e.g., luma, chroma, or R, G, B colour component information). The depth information may be used to jointly code the corresponding texture information. In examples, a device may determine whether a coding mode, such as a joint depth-color coding mode (JDCC) (e.g., joint depth-luma coding mode (JDLC)) is used for a current block. If JDCC coding mode is used for the block, then the device may decode depth sample(s) in the block and predict the corresponding color sample(s) (e.g., luma sample(s) and/or chroma sample(s)) in the block based on the decoded depth sample(s).

20 Claims, 12 Drawing Sheets

(51) Int. Cl.
*H04N 19/176* (2014.01)
*H04N 19/186* (2014.01)

(58) Field of Classification Search
USPC .................................................. 375/240.02
See application file for complete search history.

(56) References Cited

OTHER PUBLICATIONS

Coban et al., "Preliminary Draft of Algorithm Description for Enhanced Compression Model 1 Software (ECM 1)", JVET-W0102, Qualcomm, Interdigital, Ericsson, Alibaba Inc., Joint Video Experts Team (JVET) of ITU-T SG 16 WP 3 and ISO/IEC JTC 1/SC 29, 23rd Meeting, by teleconference, Jul. 7-16, 2021, 18 pages.

Merkle et al., "3D Video: Depth Coding Based In Inter-Component Prediction of Block Partitions", Picture Coding Symposium, Krakow, Poland, May 7-9, 2012, pp. 149-152.

Zhang et al., "Simplification on depth-based block partitioning (DBBP)", Joint Collaborative Team on 3D Video Coding Extensions of ITU-T SG 16 WP 3 and ISO/IEC JTC 1/SC 29/WG 11; 8th Meeting: Valencia, ES; JCT3V-H00073, Mar. 27-Apr. 4, 2014, 6 pages.

CROSS-COMPONENT DEPTH-LUMA CODING

CROSS REFERENCE

The application is the National Stage Entry under 35 U.S.C. § 371 of Patent Cooperation Treaty Application No. PCT/EP2022/077679, filed Oct. 5, 2021, which claims the benefit of European Patent Application 21306388.6, filed Oct. 5, 2021, the contents of which are incorporated by reference in their entirety herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing cross-component depth-color coding. Depth information may be used for joint or cross-component coding of texture information (e.g., luma, chroma, and/or R, G, B colour components information). The depth information may be used to jointly encode and/or decode the corresponding texture information.

In examples, a video decoding device may determine whether joint depth-color coding (JDCC) mode (e.g., joint depth-luma coding (JDLC) mode), and/or joint depth-chroma coding mode) is used for a current block. If JDCC is used for the block, then the device may decode depth sample(s) in the block and predict corresponding color sample(s) in the block, for example, based on the decoded depth sample(s). If JDCC mode is disabled for the block, the device may decode the color samples, e.g., luma samples and/or chroma samples in the block (e.g., decode luma sample(s) and/or chroma samples independently of the depth sample(s)). The device may obtain a coding mode indication (e.g., coding mode enabled indication, such as a JDCC enabled indication), for example, that may indicate whether a coding mode (e.g., JDCC mode) is used for a block.

The device may determine an edge for partitioning a block into partitions. The device may obtain an edge location, for example, based on an edge anchor and a direction associated with an intra directional mode used to code the block. The device may reconstruct the depth sample(s) in a partition of the block and reconstruct the corresponding luma sample(s) and/or chroma sample(s) in the same partition based on the depth samples or on the edge location.

For example, a first partition of the block and a second partition of the block may be identified, for example, based on the edge location. The device may obtain depth sample value(s) associated with the depth sample(s) in the first partition. The device may reconstruct luma sample value(s) associated with the luma sample(s) in the first partition, for example, based on the depth sample value(s) associated with the first partition. The device may obtain depth sample value(s) associated with depth sample(s) in the second partition. The device may reconstruct luma sample value(s) associated with the luma sample(s) in the second partition, for example, based on the depth sample value(s) associated with the second partition.

For example, a first partition of the block and a second partition of the block may be identified, for example, based on the edge location. The device may obtain depth sample value(s) associated with the depth sample(s) in the first partition. The device may reconstruct chroma sample value(s) associated with the chroma sample(s) in the first partition, for example, based on the depth sample value(s) associated with the first partition. The device may obtain depth sample value(s) associated with depth sample(s) in the second partition. The device may reconstruct chroma sample value(s) associated with the chroma sample(s) in the second partition, for example, based on the depth sample value(s) associated with the second partition.

In examples, a video encoding device may determine whether to encode a block using a coding mode (e.g., JDCC mode). The device may (e.g., based on the determination to encode the block using the JDCC mode) encode depth sample(s) in the block and encode corresponding luma sample(s) in the block, for example, based on the depth sample(s). The device may determine to enable JDCC mode for one or more of a slice, a tile, a sub-picture, a coding unit, or a block. The device may determine to include an indication (e.g., coding mode enabled indication, such as a JDCC mode enabled indication) in video data (e.g., a bitstream), for example, to indicate that JDCC mode is enabled for the slice, tile, sub-picture, a coding unit, or block.

The device may determine a prediction mode for coding depth information and a prediction mode for coding luma and/or chroma information for the block. The device may determine to use a coding mode that jointly codes depth and color samples (e.g., luma samples and/or chroma samples) to encode the block based on one or more of the following: the coding mode (e.g., JDCC mode) is enabled for the block; the prediction mode for coding depth information of the block is an intra directional mode; the prediction mode for coding luma information of the block is an intra directional mode; the prediction mode for coding depth information and the prediction mode for coding luma information of the block is the same; and/or the like. The device may determine an edge location for partitioning the block, for example, based on the determination to encode the block using the coding mode (e.g., JDCC mode). The device may include an indication of the edge location in the video data. The indication of the edge location may indicate an edge anchor position in a reference sample array.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

Figure 1A:
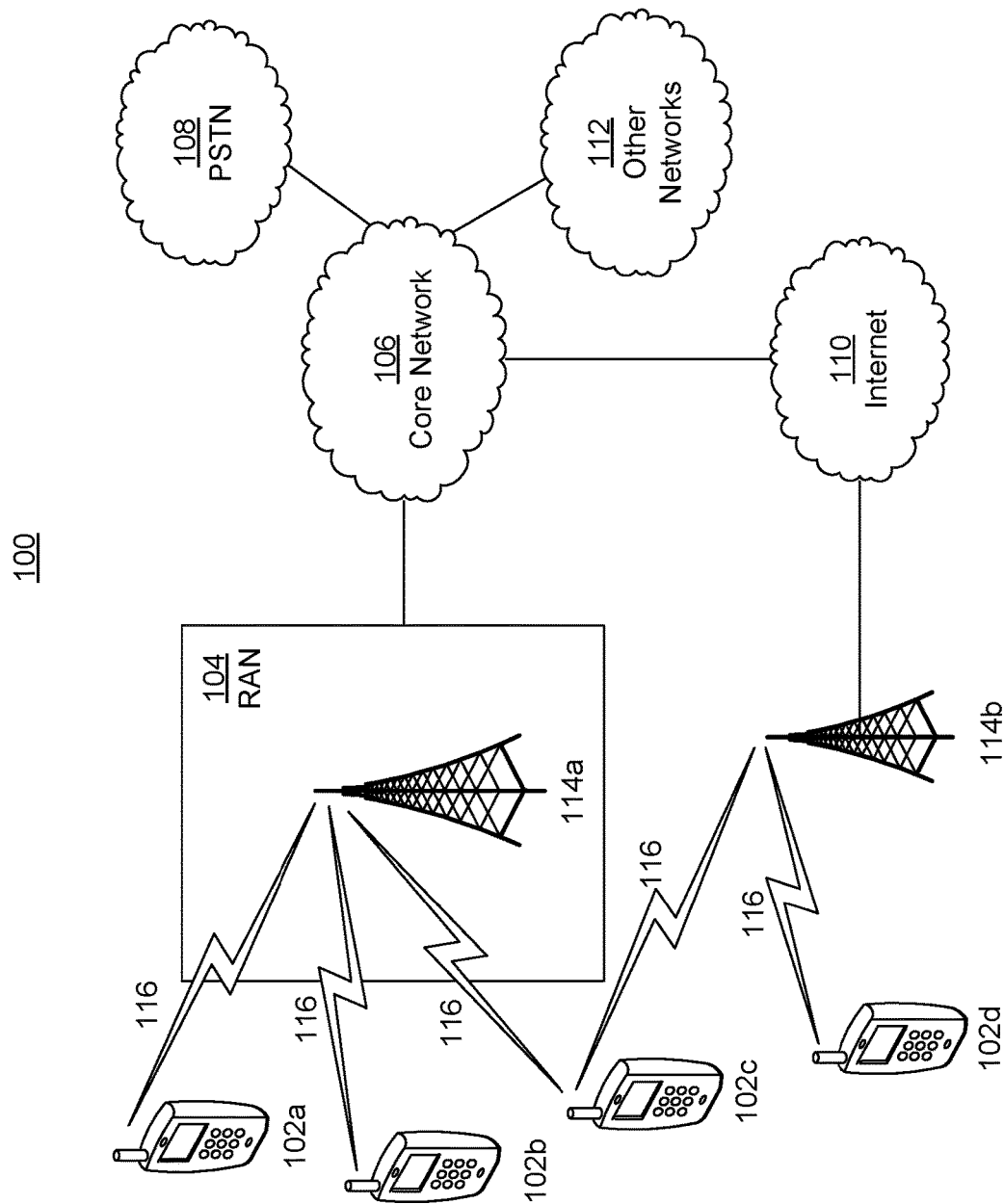
FIG. 1A is a system diagram illustrating an example communications system in which one or more disclosed embodiments may be implemented.

that may be used within the communications system illustrated in FIG. 1A according to an embodiment.

Figure 1B:
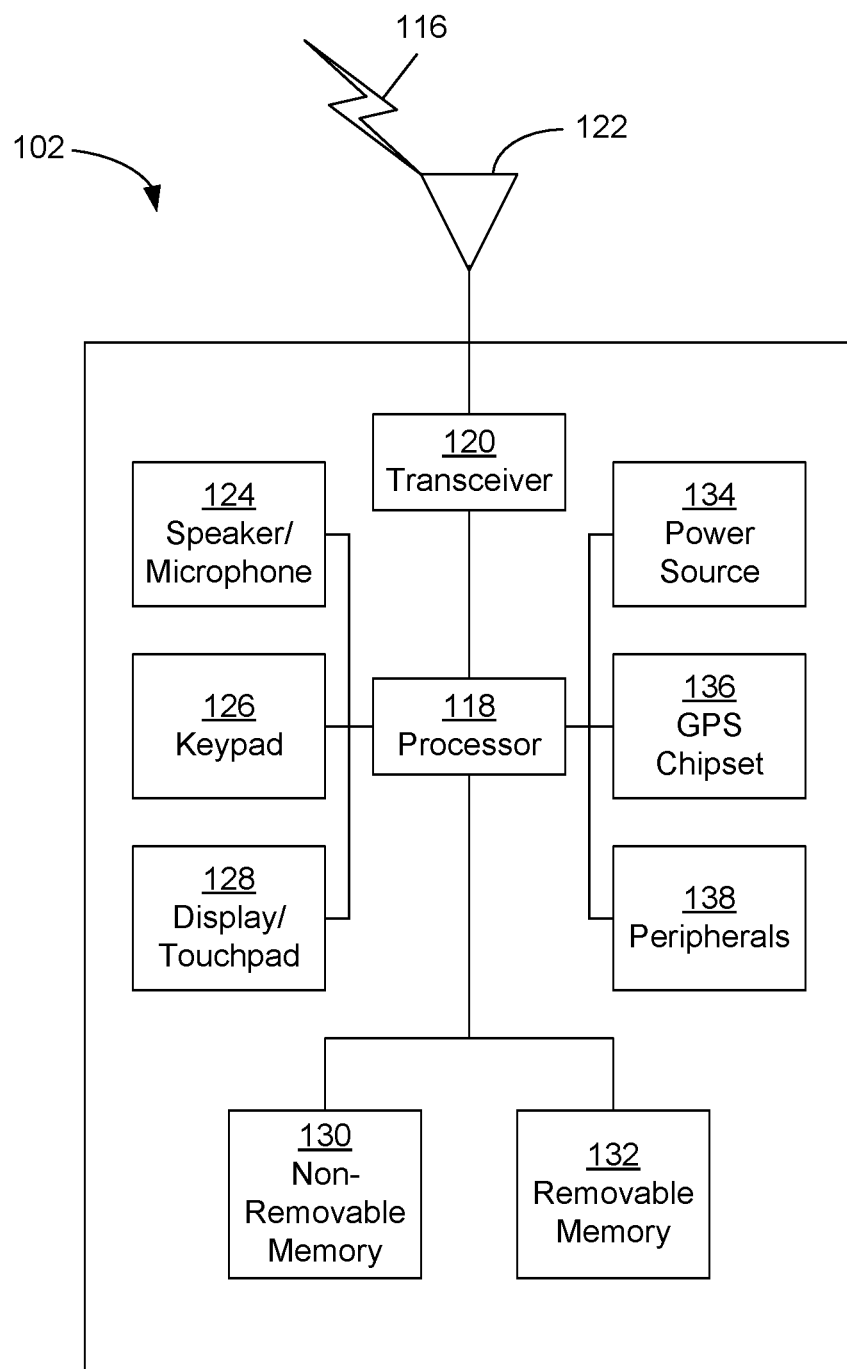
FIG. 1B is a system diagram illustrating an example wireless transmit/receive unit (WTRU) that may be used within the communications system illustrated in FIG. 1A according to an embodiment.
Figure 1C:
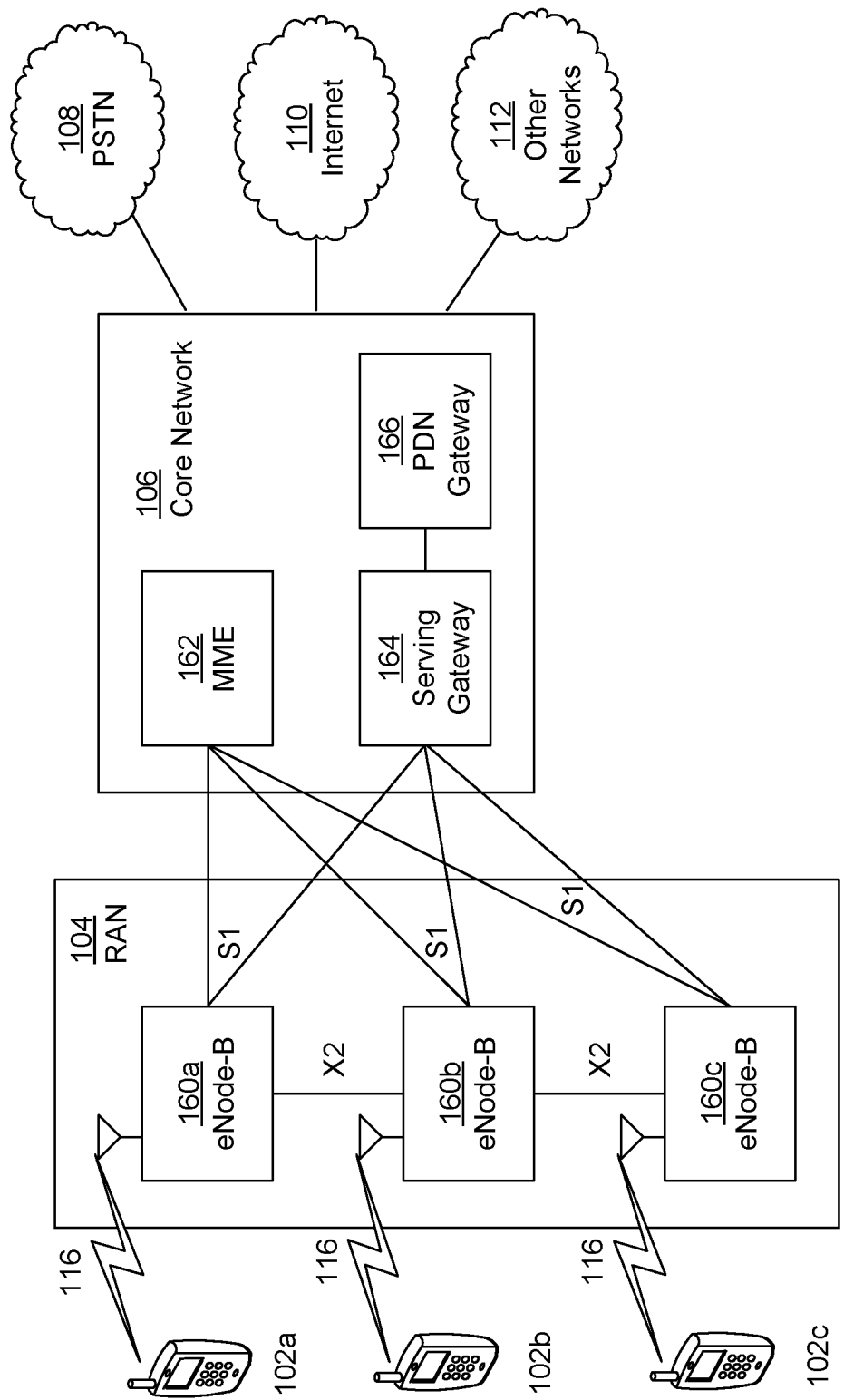
FIG. 1C is a system diagram illustrating an example radio access network (RAN) and an example core network (CN)
Figure 1D:
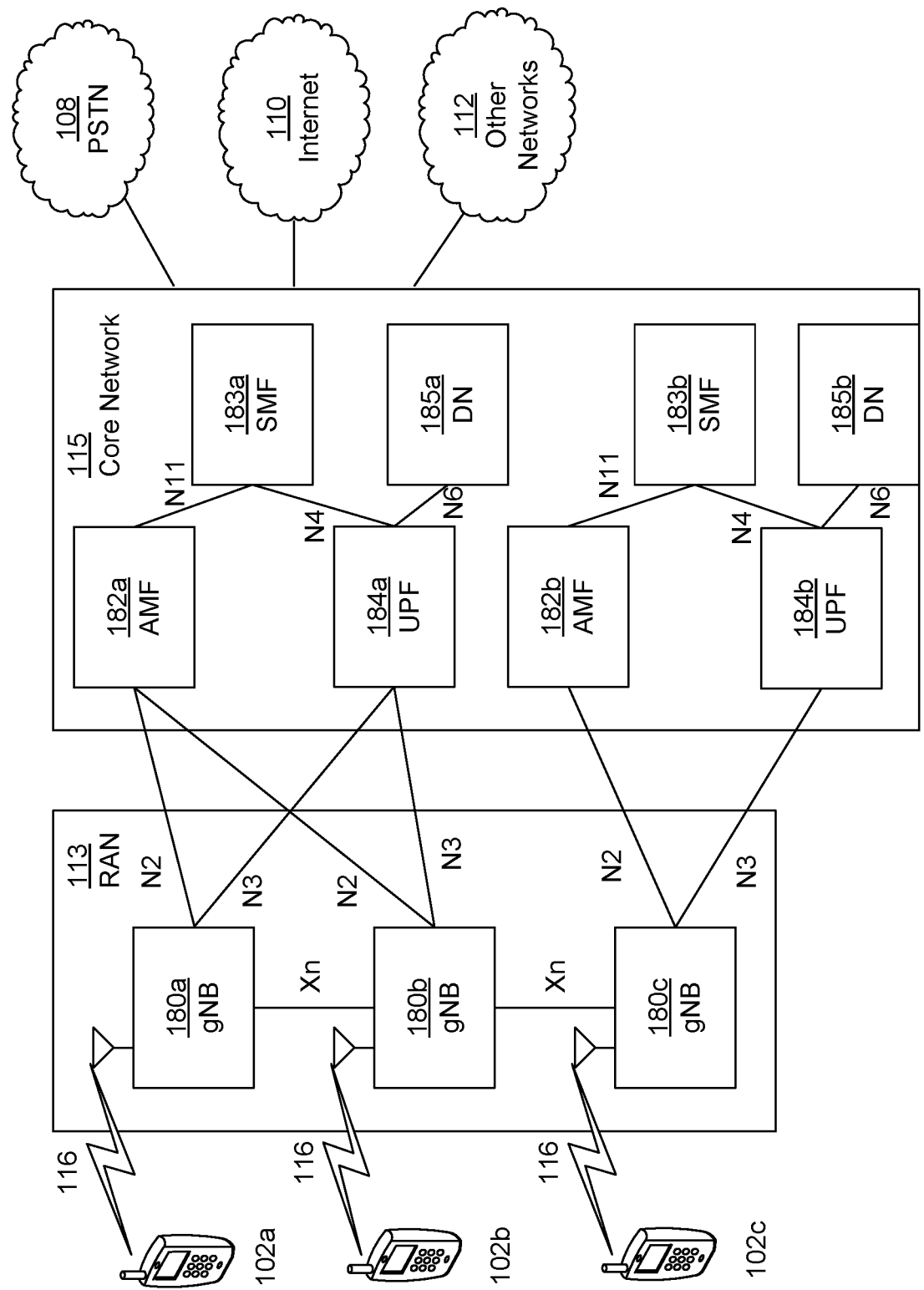

FIG. 1D is a system diagram illustrating a further example RAN and a further example CN that may be used within the communications system illustrated in FIG. 1A according to an embodiment.

Figure 2:
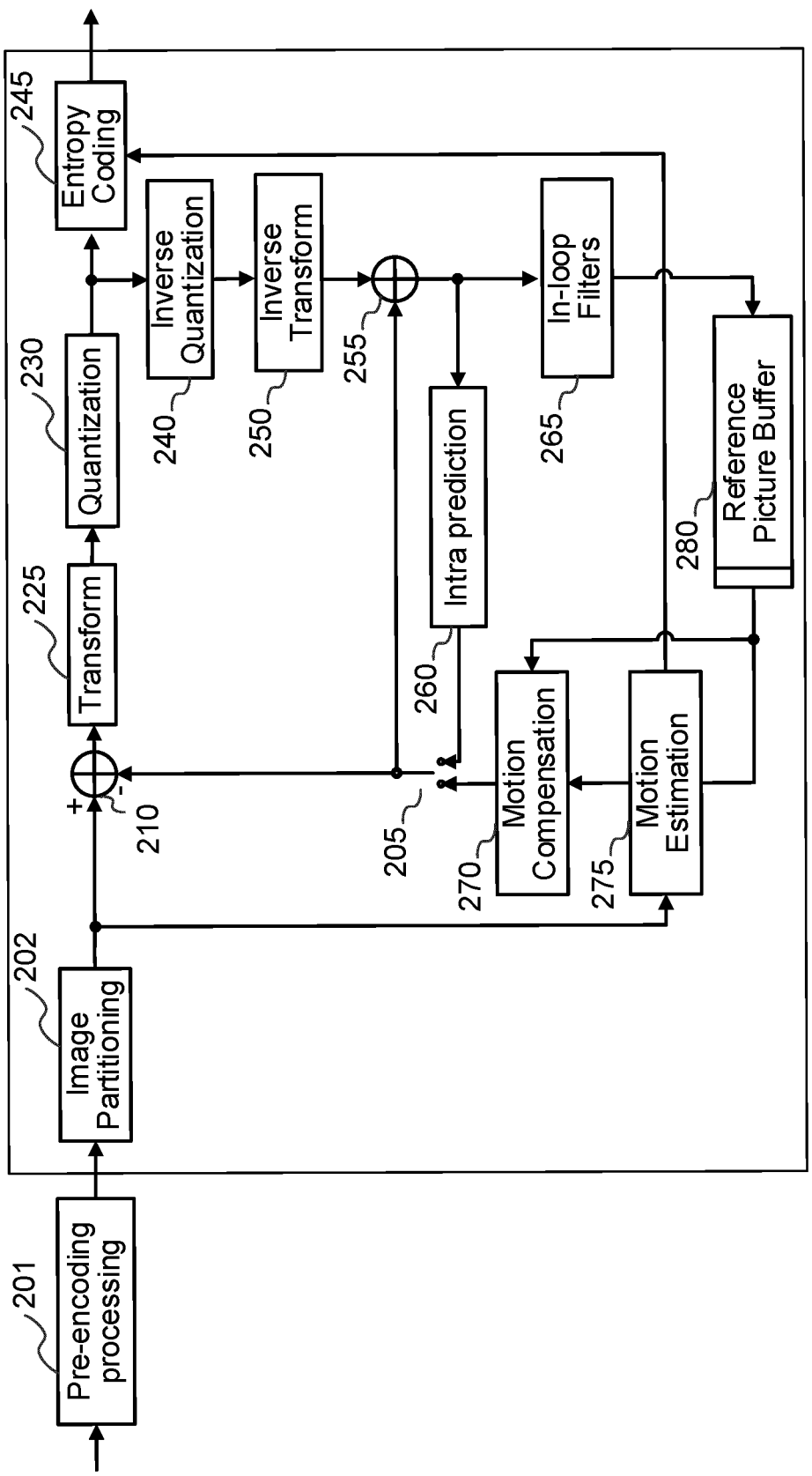

FIG. 2 illustrates an example video encoder.

Figure 3:
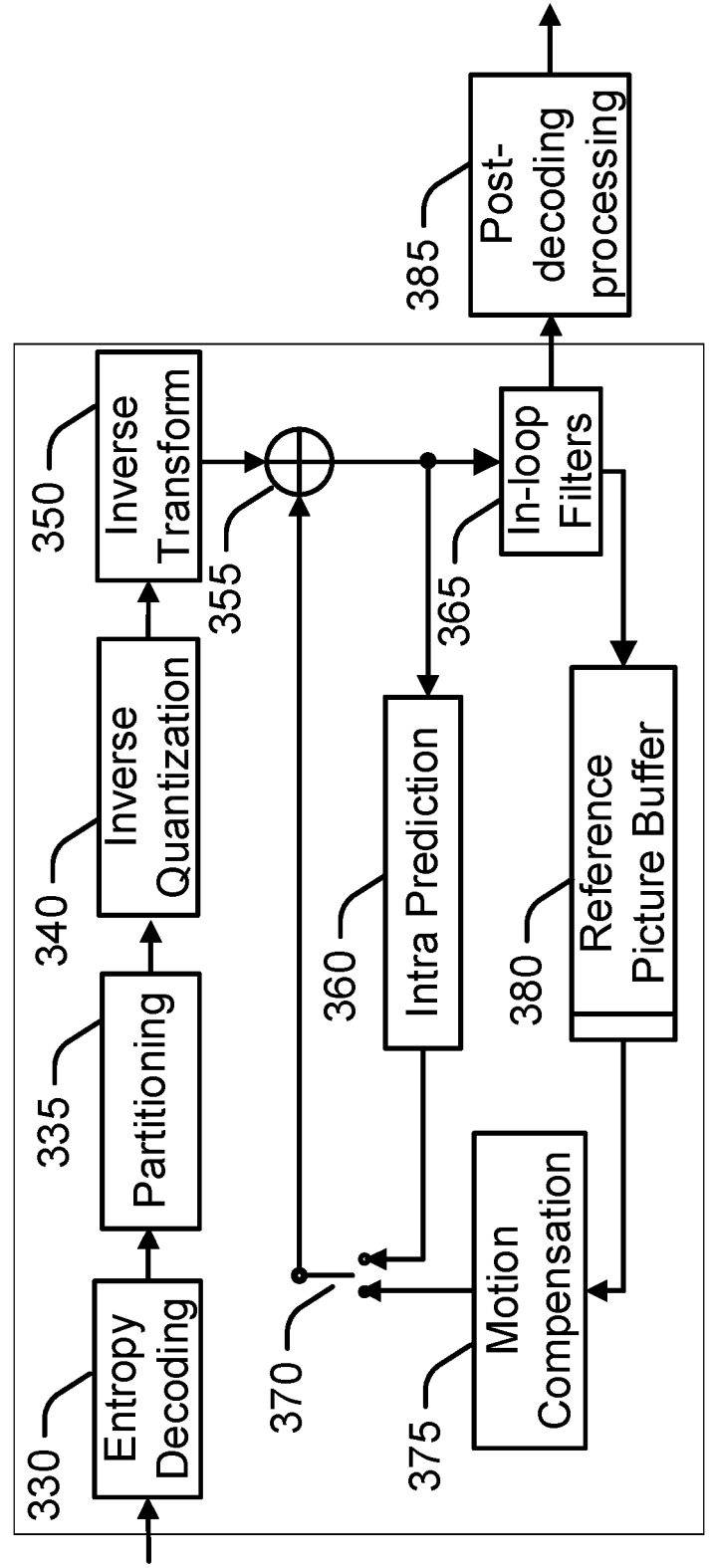

FIG. 3 illustrates an example video decoder.

Figure 4:
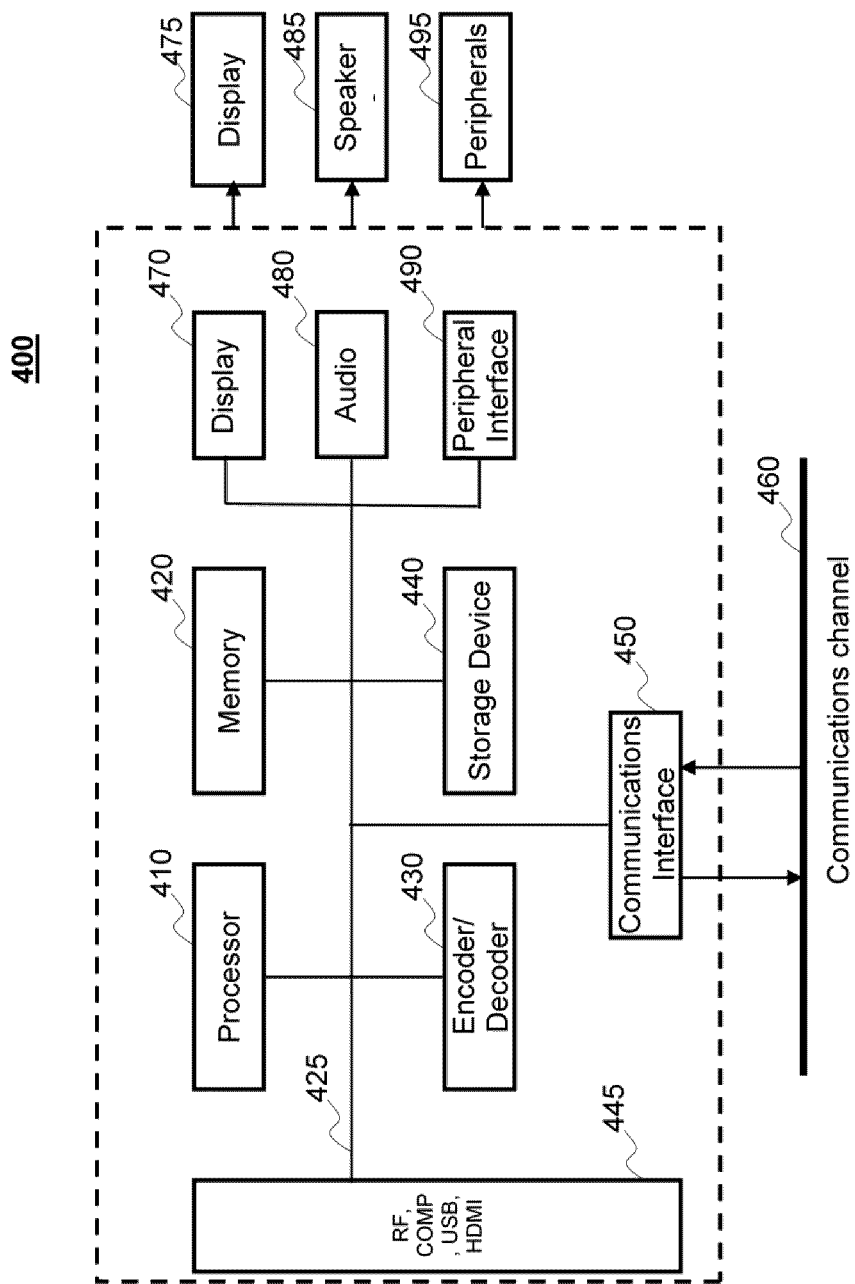

FIG. 4 illustrates an example of a a system in which various aspects and examples may be implemented.

Figure 5:
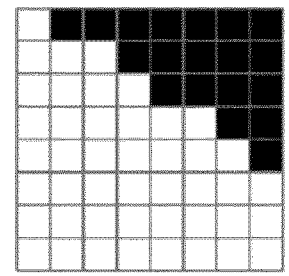
Figure 5:
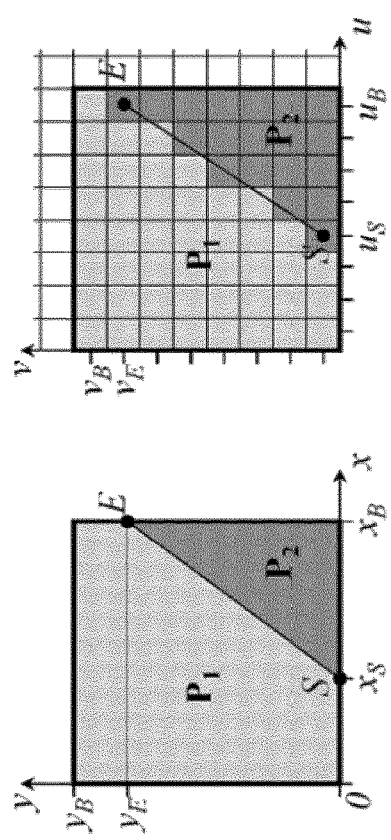

FIG. 5 illustrates an example depth modeling mode for coding depth using a wedgelet pattern.

Figure 6:
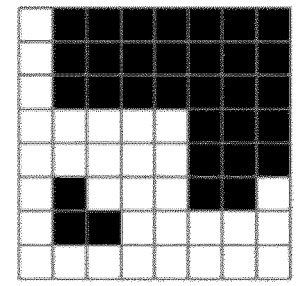
Figure 6:
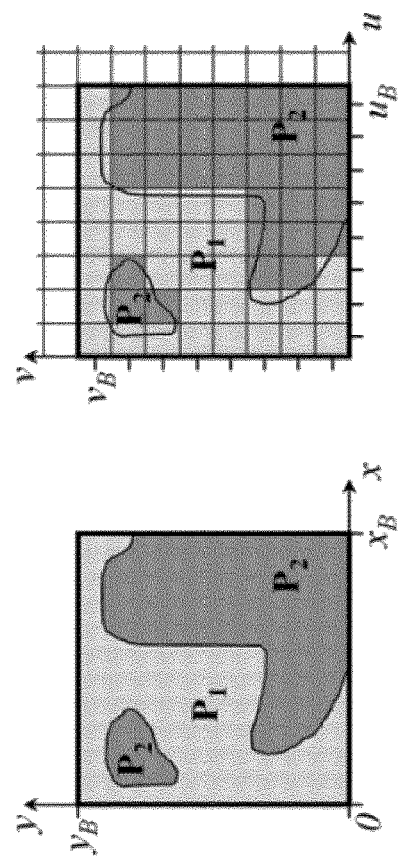

FIG. 6 illustrates an example depth modeling mode for coding depth using a contour pattern.

Figure 7:
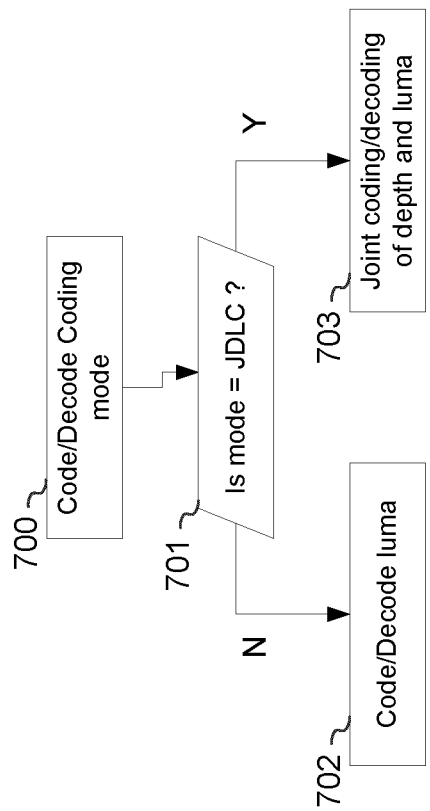

FIG. 7 illustrates a flow-chart for a JDLC coding mode.

Figure 8:
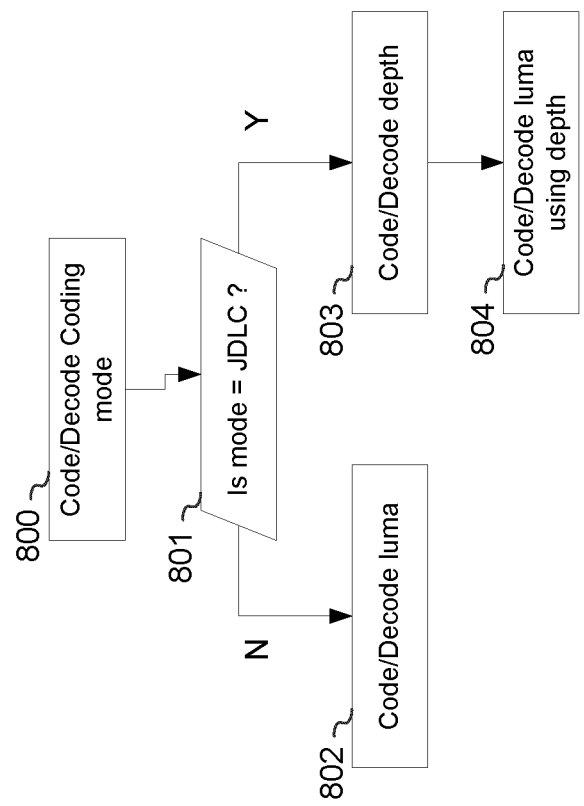

FIG. 8 illustrates a flow-chart for a coding mode corresponding to coding depth information and coding luma information.

Figures 9, 10:
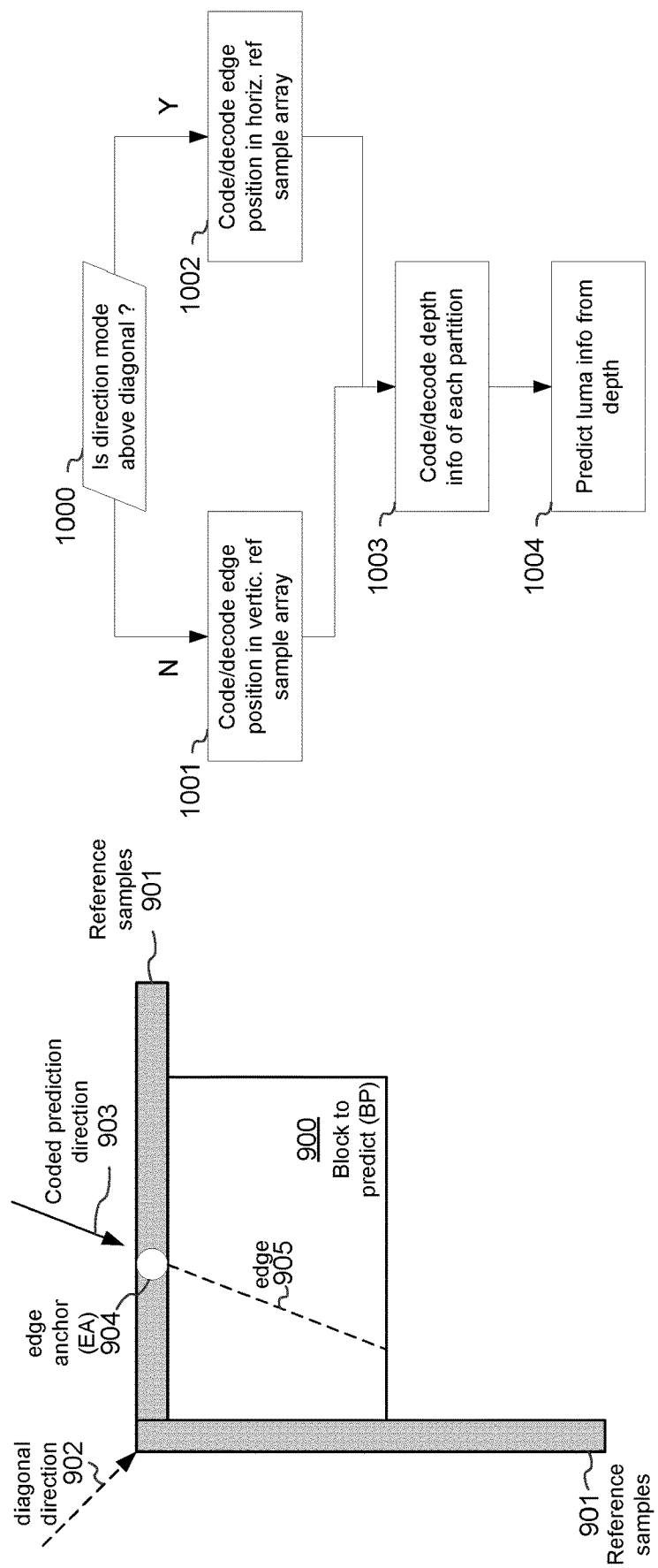

FIG. 9 illustrates an example block to predict that is split into two partitions.

FIG. 10 illustrates an example luma prediction process.

Figure 11:
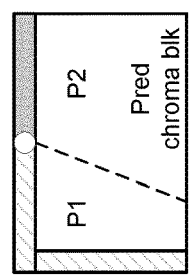
Figure 11:
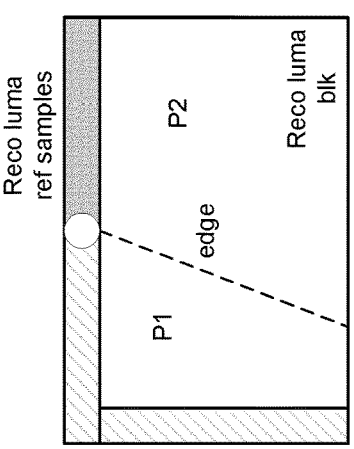

FIG. 11 illustrates an example using an edge location to determine chroma information based on luma prediction.

Figure 12:
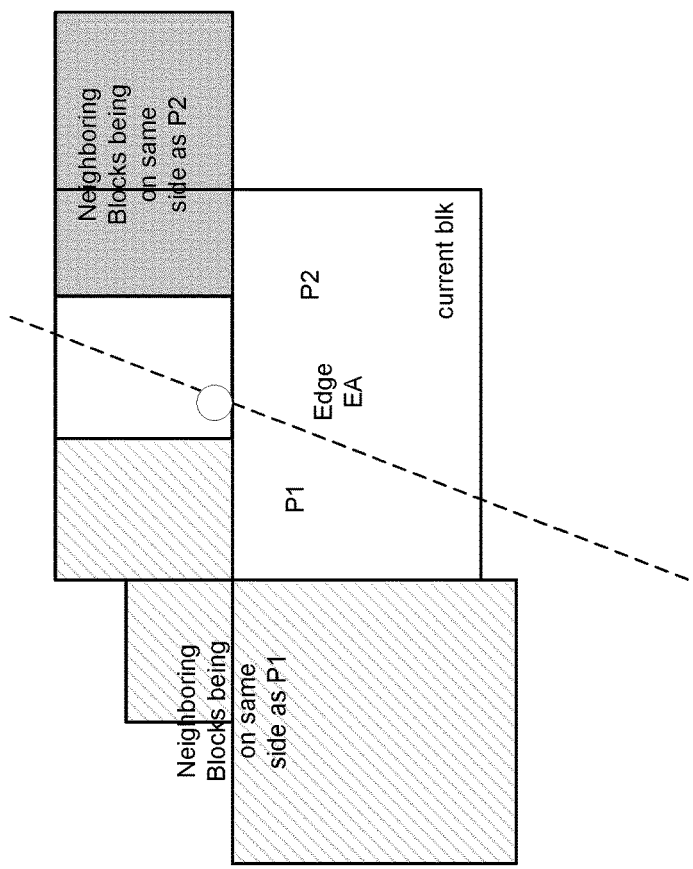

FIG. 12 illustrates an example block with neighboring blocks surrounding each partition.

Figure 13:
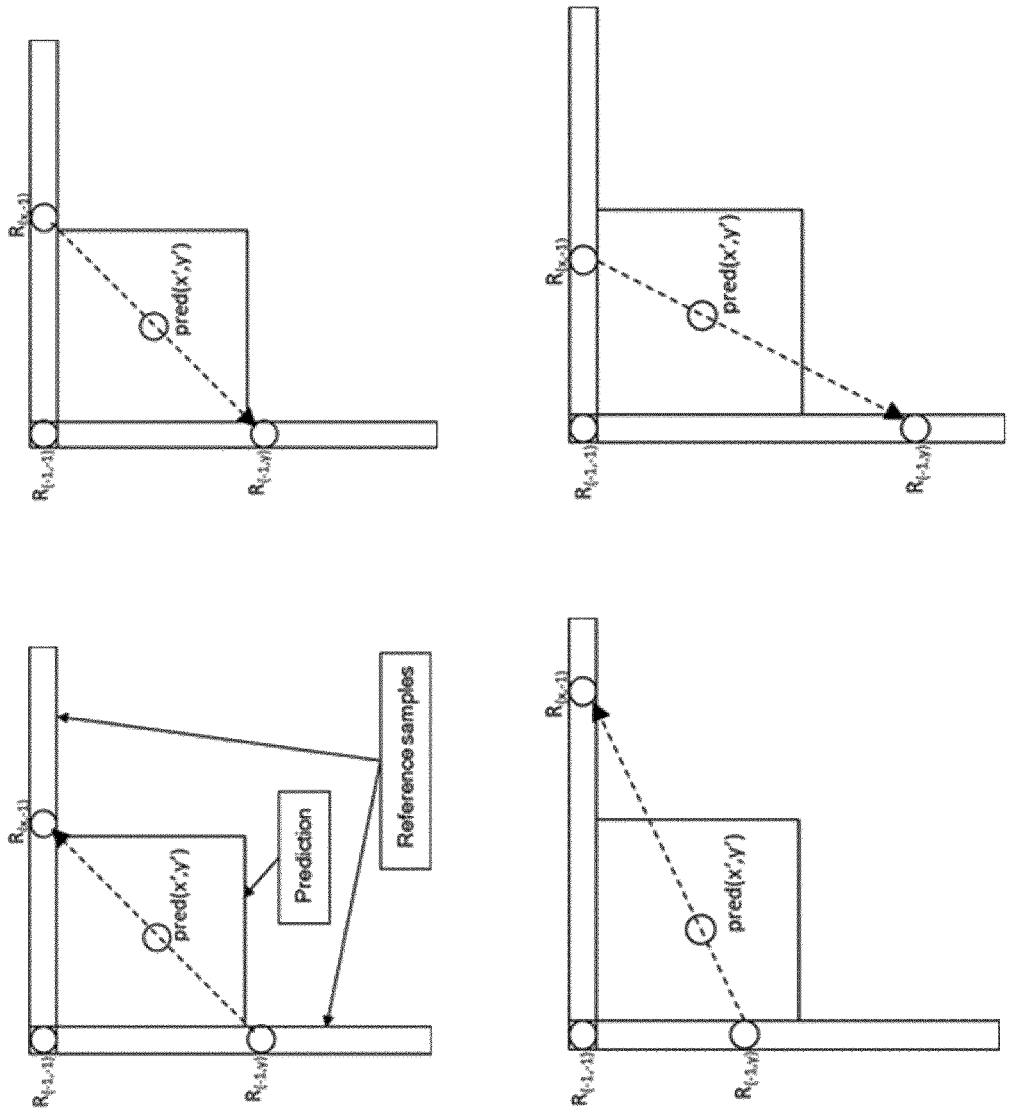

FIG. 13 illustrates an example of determining depth information for partitions.

DETAILED DESCRIPTION

A more detailed understanding may be had from the following description, given by way of example in conjunction with the accompanying drawings.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-12 described herein may provide some examples, but other examples are contemplated. The discussion of FIGS. 5-12 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, such as one or more of the following: determining whether a coding mode (e.g. joint depth-color coding mode (JDCC), joint depth-luma coding mode (JDLC), and/or joint depth-chroma coding mode) is used for a current block; if the coding mode is used for the current block (e.g., JDCC mode is used), then decoding depth sample(s) in the current block and predicting corresponding luma sample(s) and/or color samples in the current block based on the decoded depth sample(s), etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, such as one or more of the following: determining whether to encode a block using a coding mode (e.g., a JDCC mode, a JDLC mode, and/or a joint depth-chroma coding mode); based on the determination to encode the block using a coding mode (e.g., JDCC mode), encoding depth sample(s) in the block and encoding the corresponding luma and/or color samples sample(s) in the block based on the depth sample(s), etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on a coding mode indication (e.g., coding mode enabled indication) etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, a coding mode indication (e.g., a joint depth luma coding mode enabled indication, a joint depth chroma coding mode enabled indication, a joint depth color coding mode enabled indication), etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode video data (e.g., a bitstream), the encoder, video data (e.g., bitstream), and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g. using a monitor, screen, or other type of display) a resulting image (e.g., an image from residual reconstruction of the video bitstream). The TV, set-top box, cell phone, tablet, or other electronic device may receive a signal including an encoded image and perform decoding.

Systems, methods, and instrumentalities are disclosed for performing cross-component depth-color coding. Depth information may be used for joint or cross-component coding of texture information (e.g., luma, chroma, and/or R, G, B colour components information). The depth information may be used to jointly encode and/or decode the corresponding texture information.

In examples, a video decoding device may determine whether joint depth-color coding (JDCC) mode (e.g., joint depth-luma coding (JDLC) mode), and/or joint depth-chroma coding mode) is used for a current block. If JDCC is used for the block, then the device may decode depth sample(s) in the block and predict corresponding color sample(s) in the block, for example, based on the decoded depth sample(s). If JDCC mode is disabled for the block, the device may decode the color samples, e.g., luma samples and/or chroma samples in the block (e.g., decode luma sample(s) and/or chroma samples independently of the depth sample(s)). The device may obtain a coding mode indication (e.g., coding mode enabled indication, such as a JDCC enabled indication), for example, that may indicate whether a coding mode (e.g., JDCC mode) is used for a block.

The device may determine an edge for partitioning a block into partitions. The device may obtain an edge location, for example, based on an edge anchor and a direction associated with an intra directional mode used to code the block. The device may reconstruct the depth sample(s) in a partition of the block and reconstruct the corresponding luma sample(s) and/or chroma sample(s) in the same partition based on the depth samples or on the edge location.

For example, a first partition of the block and a second partition of the block may be identified, for example, based on the edge location. The device may obtain depth sample value(s) associated with the depth sample(s) in the first partition. The device may reconstruct luma sample value(s) associated with the luma sample(s) in the first partition, for example, based on the depth sample value(s) associated with the first partition. The device may obtain depth sample value(s) associated with depth sample(s) in the second partition. The device may reconstruct luma sample value(s) associated with the luma sample(s) in the second partition, for example, based on the depth sample value(s) associated with the second partition.

For example, a first partition of the block and a second partition of the block may be identified, for example, based on the edge location. The device may obtain depth sample value(s) associated with the depth sample(s) in the first partition. The device may reconstruct chroma sample value(s) associated with the chroma sample(s) in the first partition, for example, based on the depth sample value(s) associated with the first partition. The device may obtain depth sample value(s) associated with depth sample(s) in the second partition. The device may reconstruct chroma sample value(s) associated with the chroma sample(s) in the second partition, for example, based on the depth sample value(s) associated with the second partition.

In examples, a video encoding device may determine whether to encode a block using a coding mode (e.g., JDCC mode). The device may (e.g., based on the determination to encode the block using the JDCC mode) encode depth sample(s) in the block and encode corresponding luma sample(s) in the block, for example, based on the depth sample(s). The device may determine to enable JDCC mode for one or more of a slice, a tile, a sub-picture, a coding unit, or a block. The device may determine to include an indication (e.g., coding mode enabled indication, such as a JDCC mode enabled indication) in a bitstream, for example, to indicate that JDCC mode is enabled for the slice, tile, sub-picture, a coding unit, or block.

The device may determine a prediction mode for coding depth information and a prediction mode for coding luma and/or chroma information for the block. The device may determine to use a coding mode that jointly codes depth and color samples (e.g., luma samples and/or chroma samples) to encode the block based on one or more of the following: the coding mode (e.g., JDCC mode) is enabled for the block; the prediction mode for coding depth information of the block is an intra directional mode; the prediction mode for coding luma information of the block is an intra directional mode; the prediction mode for coding depth information and the prediction mode for coding luma information of the block is the same; and/or the like. The device may determine an edge location for partitioning the block, for example, based on the determination to encode the block using the coding mode (e.g., JDCC mode). The device may include an indication of the edge location in the bitstream. The indication of the edge location may indicate an edge anchor position in a reference sample array.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

In examples, coding modes may use depth information as information for coding (e.g., joint or cross-component coding) texture information (e.g., luma and/or chroma information). Compression efficiency may be improved, for example, by reducing the bitrate while maintaining the quality, or improving the quality while maintaining the bitrate. The depth information can be coded for blocks (e.g., all blocks or a subset of blocks) in a picture, or for a subset of blocks in a picture. Depth information may be used to code (e.g., jointly code) the corresponding texture information, for example, if the depth information is coded in an area of the picture.

For example, luma and depth information may be jointly coded. In a multi-view plus depth (MVD) version, a depth map may be available for a (e.g., each) texture picture of video content, for example, as a dense monochrome picture of a resolution associated with the luma picture (e.g., the same resolution as the luma picture). The depth map may represent the geometry (e.g., basic geometry) of the captured video scene.

In examples, a picture may be partitioned into coding tree units (CTUs). CTUs may represent coding processing units (e.g., basic coding processing units). CTUs may include one or more coding tree blocks (CTBs), for example, depending on the video signal (e.g., whether the video signal is monochrome or contains multiple color components). In examples (e.g., associated with a YCbCr 4:2:0 video), a CTU may include a luma CTB and (e.g., two) chroma CTB(s) (e.g., where the chroma CTBs may be each a quarter of the size of the luma CTB). The CTU size (e.g., maximum CTU size), for example, may be defined by the largest CTB of the CTU. The CTU size (e.g., maximum CTU size) may be 64×64 samples or 128×128 samples. A CTU can be recursively divided into coding units (CUs). In examples, the recursive sub-partitioning of a CU can be done according to one or more (e.g., three) partitioning modes: quadtree (e.g., division into four equally sized CUs); ternary-tree (e.g., division into three CUs of size ¼th, ¾th, ¼th); and/or binary-tree (e.g., division into two equally sized CUs). Additional partitioning may be performed, for example, where a CU is split into transform units (TUs) of smaller size than the CU size. In examples, a CU can be divided into prediction units (PUs). The PUs may share same parameters at the CU level (e.g., coding mode). In examples, a CU may be divided into PUs that may have different PU parameters (e.g., motion vectors). In examples (e.g., for intra slices), separate luma and chroma coding trees may be applied (e.g., in which case the luma and chroma CTBs can be recursively split, for example, according to their own coding trees).

Depth coding modes may be used to encode and/or decode a video sequence. In examples, different modes for coding the depth information, which may be referred to as depth modeling modes (DMMs), may be used. FIG. 5 illustrates an example depth modeling mode for coding depth using a wedgelet pattern. In examples, a DMM may use a wedgelet pattern. As shown in FIG. 5, a DMM using the wedgelet pattern may use a straight line to divide a block into two parts with a constant depth value for each part. FIG. 6 illustrates an example depth modeling mode for coding depth using a contour pattern. In examples, a DMM may use a contour pattern to partition into various parts with a constant depth value for each part. A prediction unit (PU) can be divided into (e.g., two) non-rectangle areas (e.g., via DMMs), and a constant partition value (CPV) of the depth may be encoded for each area.

Inter-component prediction of partitions may be performed, to exploit the correlations between texture and depth frames of a scene (e.g., same scene). In examples, predicting non-rectangular block partitioning for depth blocks may be enabled. Inter-component prediction may be used for predicting the depth information from the texture. Texture information may be coded (e.g., first), and the texture information may be used for coding the depth information. The texture information may be used, for example, to determine the segmentation of a depth block (e.g., partition information). Luma information may be used to determine the depth information. The segmentation of luma can be used to determine the segmentation of depth. The luma block may be analyzed to derive a partitioning of the block (e.g., which is determined to be the partitioning of the depth block).

The CPV value of a partition of the block may be predicted, for example, from the samples surrounding the block to code (e.g., adjacent left and top depth samples surrounding the block to code), for example, considering that the partitioning of the block has been derived.

A multi-model linear model (MMLM) may be used. A cross-component linear model (CCLM) may include (e.g., three) MMLM modes. In a (e.g., each) MMLM mode, the reconstructed neighboring samples may be classified into (e.g., two) classes, for example, using a threshold. The threshold may be the average of the luma reconstructed neighboring samples. The linear model of the (e.g., each) class is derived, for example, using the least-mean-square (LMS) operation. For the CCLM mode, the LMS operation may be used to derive the linear model.

Position dependent intra prediction combination (PDPC) operations may be performed. In examples, the results of intra prediction (e.g., with DC, planar, and angular modes) may be modified by a PDPC operation. PDPC may be an intra prediction operation which may invoke a combination of the boundary reference samples and intra prediction with filtered boundary reference samples. PDPC may be applied to one or more of the following intra modes, for example, without signaling: planar, DC, intra angles less than or equal to horizontal, and/or intra angles greater than or equal to vertical and less than or equal to mode 80. PDPC may be skipped (e.g., not applied), for example, if the current block is in block-based delta pulse code modulation (Bdpcm) mode, or if the multiple reference line (MRL) index is larger than 0.

The prediction sample pred(x',y') may be predicted using an intra prediction mode (e.g., DC, planar, angular) and a linear combination of reference samples, for example, according to Eq. 1.

$$pred(x', y') = \text{Clip}(0, (1 \ll BitDepth) - 1,$$

$$\left(wL \times R_{-1,y'} + wT \times R_{x',-1} + (64 - wL - wT) \times pred(x', y') + 32\right) \gg 6$$

Eq. 1

$R_{x,-1}$, and $R_{-1,y}$ may represent the reference samples located at the top and left boundaries of the (e.g., current) sample (x, y), respectively.

Boundary filters may be refrained from being used (e.g., not be needed), for example, if PDPC is applied to DC, planar, horizontal, and vertical intra modes, (e.g., additional). In the case of DC mode boundary filter or horizontal/vertical mode edge filters, boundary filters may be used (e.g., needed). The PDPC process for DC and planar modes may be identical. For angular modes, if the current angular mode is HOR_IDX or VER_IDX, left or top reference samples may not be used, respectively. The PDPC weights and scale factors may depend on prediction modes and/or the block sizes. PDPC may be applied to the block with (e.g., one or both) width and height greater than or equal to four (e.g., pixels).

In examples, texture and depth information may be coded for a block(s) (e.g., all the blocks or a subset of blocks) of a picture(s). The depth map may be coded, for example, using inter-component prediction from the luma information. Texture and depth information may be coded. Depth information coding may be performed, for example, based on texture information. As used herein, coding may include encoding and/or decoding.

Coding depth information (e.g., for all blocks of all pictures) may be inefficient (e.g., penalizing), for example, in terms of compression, e.g., if the depth information is not used (e.g., not required). Texture information may be coded from depth information.

In examples, depth information may be used (e.g., at the block level) in the coding process, for example, to get better coding efficiency of the texture. Texture coding may be improved by coding intermediate information, for example, related to depth.

In example JDCC mode(s), depth information may be used as information (e.g., additional or intermediate information) for coding (e.g., joint or cross-component coding) of texture information (e.g., luma and chroma, and/or R, G, B colour components information). The depth information can be coded for blocks (e.g., all blocks) of a picture or (e.g., only) for parts of the blocks of a picture. Depth information may be used to code (e.g., jointly code) the corresponding texture information, for example, if depth information is coded in an area of the picture.

In examples, the depth information may be used as intermediate information coded prior to the texture information. The depth information may be used to predict and code the texture information.

In examples, depth information may be used to classify the samples into classes (e.g., two classes or the like) during the CCLM process. The depth information may be used to apply different linear model(s) for different classes of samples. For example, two different linear models may be used for samples in two classes, for example, a (e.g., one) linear model for each class (e.g., one linear model applies for each one of the plurality of partitions). In examples, a CCLM model may be used to predict luma information from depth information for a (e.g., each) partition.

In examples, the PDPC process may be modified for samples on an edge, for example, based on the depth information.

Depth information may be used for one or more of the following: reference sample interpolation and smoothing for intra prediction; most probable mode (MPM) derivation; decoder side intra mode derivation (DIMD); and/or the like.

Texture information may include a (e.g., at least one) color component (e.g., luma and/or chroma). Texture information may include a luma component and two chroma components (e.g., for non-monochrome YUV videos). Texture information may include a (e.g., at least) one color component (e.g., R, G, or B). While examples provided herein use luma component as example texture information, the examples provided herein may apply to other texture information such as chroma and/or R, G, B colour information. The terms luma, texture, chroma, and color component may be used interchangeably herein.

A block-level mode may involve coding (e.g., joint coding) depth and texture information. In examples, a joint depth-luma coding (JDLC) coding mode may be used at the block level. JDLC may correspond to coding (e.g., joint coding) of depth and luma information. JDLC may correspond to coding (e.g., joint coding) of depth and texture information (e.g., luma, chroma and/or R, G, B colour component information). Alternate supported coding modes may correspond to coding of luma, chroma for example, without coding (e.g., any) depth data.

FIG. 7 illustrates an example JDCC mode such as the JDLC coding mode. The coding mode may be derived from data parsed in the input bitstream (e.g., as shown at 700 in FIG. 7). As shown at 701 in FIG. 7, the coding mode may be checked to determine whether the coding mode corresponds to a mode involving luma coding (e.g., luma-only coding) or a mode involving joint depth and luma coding (e.g., is mode=JDLC?). The luma samples of the block may be decoded (e.g., without depth information or independently of depth information), for example, as shown at 702 in FIG. 7, e.g., if the coding mode corresponds to a mode involving luma coding (e.g., luma-only coding). Otherwise, joint decoding of depth and luma samples may be performed (e.g., as shown at 703 in FIG. 7), for example, if the coding mode corresponds to a mode involving joint depth and luma coding. As those skilled in the art would appreciate, the process shown in FIG. 7 may apply to both encoding and decoding.

In examples, the JDLC coding mode may involve coding depth information then coding luma information, for example, based on the depth information. The coding mode may correspond to coding depth information and coding luma information based on the depth information. FIG. 8 illustrates an example coding mode corresponding to coding luma information based on depth information. The coding mode used for coding a block may be derived from data parsed in the input bitstream (e.g., as shown at 800 in FIG. 8). As shown at 801 in FIG. 8, the coding mode may be checked to determine whether the coding mode corresponds to a mode involving luma coding (e.g., luma-only coding) or a mode involving depth information-based luma coding. The luma samples of the block may be decoded (e.g., as shown at 802 in FIG. 8), for example, if the coding mode corresponds to a mode involving luma coding (e.g., luma-only coding). Otherwise, the depth information may be (e.g., first) decoded and then the luma samples may be decoded, for example, based on the previously decoded depth information (e.g., as shown at 803 in FIG. 8), e.g., if the coding mode corresponds to a mode involving depth information-based luma coding. As those skilled in the art would appreciate, the process shown in FIG. 8 may apply to both encoding and decoding.

JDCC such as JDLC may be enabled, for example, via an indication in video data. JDLC may be enabled (e.g., via an indication) for an area of the picture (e.g., a slice, a tile, a sub-picture) or at the block level (e.g., CTU, CU level, PU, or TU level).

JDCC such as JDLC may be enabled (e.g., activated), for example, via an indication (e.g., using a flag). In examples, if JDCC is enabled (e.g., activated) for a block (e.g., via an indication, such as an JDCC enablement indication in video data), the (e.g., same) prediction mode may be coded for depth and luma and/or chroma. Whether JDCC mode is used may be determined, for example, based on the signal indication (e.g., flag).

In examples, the depth information may be coded/decoded (e.g., as described herein with respect to FIG. 7 and FIG. 8), for example, if conditions are met. In examples, the conditions may include one or more of the following: the coding mode (e.g., JDLC) is enabled (e.g., activated) for a block, for example, via an indication (e.g., a flag); the same prediction mode is used for coding depth and luma; the prediction mode for coding depth and luma is an intra directional mode; and/or the like. The depth information may indicate (at least indicated) the location in the reference samples array of the depth edge that splits the depth block into multiple partitions (e.g., two partitions).

FIG. 9 illustrates an example block to predict that is split into two partitions. The location in the reference samples array of the edge that splits the depth block into two partitions may be referred to as an edge anchor (EA) (e.g., as shown in FIG. 9). As shown in FIG. 9, the block to predict (BP) is shown at 900 and the reference samples for prediction are shown at 901. FIG. 9 indicates the diagonal direction 902 and the coded intra directional prediction mode 903. The edge location in the reference sample array may be referred to as an edge anchor (EA) 904 (e.g., as shown in FIG. 9 as the circle). FIG. 9 indicates the location of the edge 905 between the two partitions inside the block.

In examples, depth information may be coded for a partition (e.g., each partition). A depth value (e.g., single depth value) may be coded for a (e.g., each) partition). Depth information may be constant in an area (e.g., per area). The depth value may be predicted, for example, from depth data (e.g., depth information) from neighboring blocks (e.g., if they are available). A prediction of a depth value for a partition at the left of an edge may be computed from reference depth samples located at the left side of an EA (e.g., as shown in FIG. 9, reference samples from the left column neighboring the BP, and reference samples from the top line above the BP located at the left side of the EA). A prediction of the depth value for the partition at a right side of the edge may be computed from the reference depth samples located at the right side of the EA (e.g., as shown in FIG. 9 reference samples from the top line above the BP located at the right side of the EA). In examples, the depth data coded for a partition (e.g., each partition) may be made of parameter values of a parametric model. For example, parameters (a, b, c) of a linear model may be defined according to Eq. 2.

$$\text{depth}(x, y) = a + b*x + c*y \qquad \text{Eq. 2}$$

Parameters (a, b, c) may be different between partitions (e.g., different for partition P1 and for partition P2). The parameters (e.g., parametric model parameters) may be predicted from neighboring depth samples, for example, if (e.g., when) the neighboring depth samples are available, or from parametric model parameters used for neighboring blocks, if (e.g., when) the neighboring parametric model parameters are available.

FIG. 10 illustrates an example luma prediction process. The luma prediction process may be performed (e.g., if the conditions described herein with respect to depth information being coded, the same prediction mode being used to predict depth and luma, and/or the prediction mode being an intra directional mode). The intra direction prediction model may be used to determine the reference sample array for identifying the edge location (e.g., as shown at 1000 in FIG. 10). For example, a prediction mode associated with coding depth information and/or luma information may be determined. The prediction mode associated with coding depth information and/or luma information may be determined, for example, using DIMD. For example, whether the intra direction prediction mode is below the diagonal direction or above the diagonal direction (e.g., or if the intra prediction mode corresponds to a horizontal or a vertical direction, respectively) may be used to determine the reference sample array for identifying the edge location (e.g., as shown at 1000 in FIG. 10). In examples, the edge position in the reference sample array (e.g., located at the left of the current block) may be decoded, for example, if (e.g., it is determined that) the intra direction mode is below the diagonal direction (e.g., as shown at 1001 in FIG. 10). In examples, the edge position in the reference sample array (e.g., located at the top of the current block) may be decoded, for example, if (e.g., it is determined that) the intra direction mode is above the diagonal direction (e.g., as shown at 1002 in FIG. 10).

The depth information for a partition may be decoded, for example, which may include the depth samples information corresponding to the partition. A block may be partitioned (e.g., split by the depth edge obtained by propagating the edge position EA using the intra prediction direction, as shown at 1003 in FIG. 10), for example, as illustrated by the edge 905 inside the block BP 900 (e.g., as shown in FIG. 9). The prediction of luma samples from the decoded depth information may be performed, for example, to obtain the luma prediction signal (e.g., as shown at 1004 in FIG. 10). For example, for a (e.g., each) partition Pi (e.g., where i=1, 2), the intra prediction mode can be determined (e.g., using the decoder side intra mode derivation (DIMD) approach), for example, from the neighboring luma samples or blocks that are on the same side of the edge as the partition Pi (e.g., as shown in FIG. 12), where a first set of luma blocks are on same side as partition P1, a second set of luma blocks are on same side as partition P2, and the luma block is crossed by the edge. A (e.g., each) partition may use a respective (e.g., different) DIMD approach. Neighboring luma blocks that are crossed by the edge EA may be taken into account, for example, proportionally to the number of samples in the luma blocks being on the same side as the partition Pi. In examples, the intra mode dir_DIMDi derived for a (e.g., each) partition Pi (e.g., where i=1, 2) from DIMD (e.g., computed using the neighboring luma blocks from the same side of the edge as the partition Pi) may be mixed with the direction mode corresponding to the edge dir_EA, for example, as a weighted sum of the two directional modes index (e.g., where the weights w1 and w2 may be equal to 0.5 for each mode, or w2=1−w1, and w1 is derived inside a predefined set of discrete values in [0,1], an index being inferred or signaled to indicate which value is used). The resulting mode dir_MIXEDi to be applied to the partition Pi, may be computed with EQ. 3.

$$dir_{MIXEDi} = w1 * dir_{DIMDi} + w2 dir_{EA} \qquad \text{Eq. 3}$$

The process (e.g., described herein) for the luma samples can also apply for predicting the chroma samples.

For example, a prediction mode associated with coding color information may be determined. The prediction mode associated with coding color information may be determined, for example, using DIMD. Color information may include luma information and/or chroma information. The prediction mode associated with coding depth information, luma information and/or chroma information may be determined, based on the partition. DIMD may be performed to derive the intra prediction mode of samples in a partition of the coding block based on the neighboring blocks corresponding to the partition.

The depth information may include the location of the edge anchor EA in the reference samples array. The location of EA may be indicated, for example, via a signal (e.g., as shown at 703 and/or 803 in FIG. 7 and FIG. 8 respectively). The location of the EA may be indicated as a 1-D parameter, for example, because the location is defined in a 1-D sample array defined as the top horizontal or left vertical sample arrays surrounding the block (e.g., depending on whether the intra prediction direction is above or below the diagonal prediction mode). The location of the EA may be indicated (e.g., via a signal), for example, with full-pel or sub-pel accuracy. The location of the EA (e.g., position) may be coded/decoded relative to a reference position. If the position is indicated (e.g., via a signal) in the top reference samples array, the position can be indicated (e.g., via a signal), for example, relative to the most left position, or middle position, or most right position, in the top reference array. If the position is indicated (e.g., via a signal) in the left reference samples array, the position can be indicated (e.g., via a signal) relative to the top-most position, or the middle position, or the bottom-most position, in the left reference array.

Luma information and chroma information may be coded, for example, based on knowing the depth edge location in the block. The location in the block of the depth partition edge (e.g., knowing the location) may be used to predict the luma and chroma signals.

In examples, chroma information may be determined based on a luma prediction, for example, where the edge location is used to improve the prediction. FIG. 11 illustrates an example of using an edge location to determine chroma information based on luma prediction. Chroma information may be determined based on a luma prediction where the edge location is used to improve the prediction, for example, based on the cross-component linear model (CCLM) mode for predicting the chroma samples of a block from co-located reconstructed luma samples (e.g., filtered) of the block, and from the reconstructed luma (e.g., filtered) and reconstructed chroma samples neighboring the block. A linear model may be used to predict the chroma samples C(p) at a relative location p in the chroma block, for example, using the co-located luma sample L(p) at the same relative position p in the luma block. The linear model may be used, for example, as shown in Eq. 4.

$$C_{pred}(p) = a * L(p) + b \qquad \text{Eq. 4}$$

$C_{pred}(p)$ may be the chroma sample prediction at relative location p in the chroma block, and (a,b) may be the linear model parameters. In CCLM, the values of a and b may be determined, for example, using neighboring reconstructed luma and chroma samples.

In examples, multiple (e.g., two) linear models can be determined (e.g., one model for each side of the edge) for a block. Referring to FIG. 11, a first model (a0,b0) may be determined using reference samples associated with the neighboring reconstructed samples of partition P1, and a second model (a1,b1) may be determined using reference samples associated with the neighboring reconstructed samples of partition P2. Chroma samples on left and right sides of the edge (e.g., partition P1 and P2, respectively, in FIG. 11) may be predicted using models (a0,b0) and (a1,b1), respectively. For any pixel p in Pi (e.g., where i=0, 1), the chroma sample prediction at relative location p in the chroma block may be determined using Eq. 5.

$$C_{pred}(p) = ai * L(p) + bi \qquad \text{Eq. 5}$$

For pixels p close to the edge, a blending process can be applied, for example, using Eq. 6.

$$C_{pred}(p) = w * (a0 * L(p) + b0) + (1 - w) * (a1 * L(p) + b1) \qquad \text{Eq. 6}$$

where w may be the blending weight. In examples, w can be set to 0.5, or can be a function of the distance to the edge d(p,edge).

In examples, multiple linear models may be derived for a coding block (e.g., one for each partition). Multiple linear models may be derived for a (e.g., each) partition, for example, using (e.g., only using) the reference samples located on the same side of the edge as the partition. For example, referring to FIG. 11, two models (a0,b0) and (a0', b0') may be determined for partition P1 from reference samples associated with the neighboring reconstructed samples of partition P1 (e.g., such as done with MMLM), and two other models (a1,b1) and (a1',b1') may be determined for partition P2 from reference samples associated with the neighboring reconstructed samples of partition P2 (e.g., such as done with MMLM).

Luma information may be coded and/or decoded from depth information, for example, using a parametric model. In examples (e.g., after depth information has been coded or decoded), a luma-from-depth prediction may be applied to a (e.g., each) partition (e.g., as described herein), for example, using a linear model to predict the luma samples C(p) at a relative location p in the luma block (e.g., from the co-located depth sample D(p) at the same relative position p in the depth block). The linear model may be represented as Eq. 7.

$$L_{pred}(p) = a * D(p) + b \qquad \text{Eq. 7}$$

$L_{pred}(p)$ may be the luma sample prediction at the relative location p in the luma block, and (a, b) may be the linear model parameters.

A resampling of depth samples may be applied (e.g., first applied), for example, to obtain resampled depth samples D (p) at a (e.g., same) resolution and sample location as $L_{pred}(p)$, for example, if the depth samples are not coded at the same resolution as the luma samples.

PDPC may be performed, for example, based on the edge location information. In examples, the depth edge information may be used in the PDPC process. The depth edge information may be used to determine if the reference samples used in the PDPC process, for example, $R_{x,-1}$ and $R_{-1,y}$ at the top and the left of the current sample (x, y) (e.g., as shown in FIG. 13) respectively belong to the same partition (e.g., as shown in FIG. 11). FIG. 13 illustrates an example of determining depth information for partitions.

The PDPC process may be performed for the current sample, for example, If $R_{x,-1}$ and $R_{-1,y}$ belong to the same partition as the current sample. FIG. 12 illustrates an example block with neighboring blocks surrounding each partition. The PDPC process may be skipped (e.g., not applied to) for the current sample (e.g., as shown in FIG. 12), for example, if $R_{x,-1}$ and $R_{-1,y}$ do not belong to the same partition as the current sample. PDPC may be used to derive the prediction at a position (x, y), for example, as a weighted sum of the initial prediction and of the reference samples $R_{x,-1}$ and $R_{-1,y}$.

In examples (e.g., if a reference sample does not belong to the same partition as the current sample), the reference sample may be replaced, for example, by the closest reference sample belonging to the same partition as the current sample.

In examples (e.g., if the depth information is not available) edge detection may be performed, for example, by computing the difference (e.g., absolute difference) between the current sample and the (e.g., four) neighbors. The current sample may be considered to be located on an edge, for example, if one of the absolute differences is greater than a given threshold.

In examples, the depth information may be used to select the boundary samples (e.g., which may be modified in PDPC), for example, if the depth information is jointly encoded with luma (e.g., where the depth information is encoded before the luma). Boundary samples may be modified in PDPC (e.g., or else the PDPC operation may skip those luma samples), for example, if the secondary reference pixels (e.g., which are used to modify the initial luma predicted values) belong to the same depth partition as the boundary samples.

Reference sample interpolation and smoothing may be performed for intra prediction. The reference samples used in intra prediction may be filtered (e.g., with smoothing Gaussian filters), for example for certain prediction angles. The reference samples used in intra prediction may be interpolated (e.g., with 2-tap linear filters, 4-tap cubic filters, etc.) In examples, the filter to be used for reference sample smoothing and interpolation may be selected, for example, based on the depth map of the neighboring reference samples (e.g., if the depth information is jointly encoded with luma information). The reference samples may be extended to the left, for example, for the prediction directions between the horizontal and the vertical directions (e.g., below and above the diagonal direction). The interpolation and smoothing filters (e.g., in this case) may be determined, for example, based on the depth map. For example, the reference samples (e.g., only those reference samples) that belong to the same depth map as the predictor sample may be used, for example, if a predictor sample (e.g., a predictor sample (e.g., needing) to be interpolated) is close to the edge anchor EA (e.g., such that the interpolating reference samples have different depth maps). Considering the 4-tap cubic filter, a 2-tap interpolation may be performed, for example, if (e.g., only if) the left most or the right most reference sample is in the other depth map. A nearest neighbor interpolation may be used, for example, if two left or two right reference samples are in the other depth map.

A most probable mode (MPM) derivation may be performed. In examples, the depth map in the decoded blocks on the top and/or left of the current blocks (e.g., if it is available) can be used to determine the construction of the MPM set (e.g., for intra mode coding). For example, the intra directional mode corresponding to the direction of the edge anchor EA can be considered as a (e.g., one) candidate to be inserted in the MPM list. In examples, the direction of the edge anchor EA may be placed at the top of the MPM list. In examples, additional MPMs can be inserted in the MPM list, for example, from a mixed value of the direction of the EA and of the intra directional modes neighboring the current block, e.g., if these modes exist.

A decoder side intra mode derivation (DIMD) may be performed. In decoder side intra mode derivation (DIMD), the decoder may estimate the luma pixel gradient values, for example, using the (e.g., already) decoded samples on top and on left of the target block. The gradients may be estimated, for example, using a Sobel operator over a 4×4 block. Multiple intra prediction directions may be determined, for example, using the histogram of the computed gradients. The intra prediction directions may be combined with planar mode with linear weighting and the resulting prediction may be compared with those obtained from the usual angular modes. In examples, depth information can be utilized to improve the estimation of the gradient values, for example, if the depth information of the decoded samples on the top and on the left of a target block is decoded jointly with luma. The depth information can (e.g., alternatively or additionally) be directly used to determine the edge and the prediction direction in the target luma block.

The processes described herein may be applied to both to the encoder and the decoder.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video decoding device, comprising:
   a processor configured to:
      obtain a joint depth-color coding (JDCC) enabled indication;
      determine that a JDCC mode is used for a coding block based at least on a value associated with the JDCC enabled indication;
      based on the determination that the JDCC mode is used for the coding block, obtain depth information for the coding block comprising a plurality of depth samples; and
      predict, based on the plurality of depth samples, a corresponding plurality of color samples in the coding block; and
      decode the coding block based on the predicted corresponding plurality of color samples in the coding block.

2. The video decoding device of claim 1, wherein the plurality of color samples comprises at least one of a plurality of luma samples or a plurality of chroma samples.

3. The video decoding device of claim 1, wherein the JDCC enabled indication is a block-level JDCC enabled indication.

4. The video decoding device of claim 1, wherein the determination that the JDCC mode is used for the coding block is based on a JDCC enabled indication associated with the coding block, a prediction mode associated with coding depth information for the coding block, and a prediction mode associated with coding color information for the coding block.

5. The video decoding device of claim 1, wherein the processor is further configured to:
   obtain a depth edge location in the coding block based on the depth information for the coding block;
   identify a first partition of the coding block and a second partition of the coding block based on the depth edge location;
   determine, using decoder side intra model derivation (DIMD), a first prediction mode for the first partition based on a first set of neighboring blocks;
   predict a first plurality of color samples in the first partition based on the determined first prediction mode; and
   determine, using DIMD, a second prediction mode for the second partition based on a second set of neighboring blocks; and
   predict a second plurality of color samples in the second partition based on the determined second prediction mode.

6. The video decoding device of claim 1, wherein the depth information comprises a depth edge anchor, and wherein the processor is further configured to:
   obtain a depth edge location based on the depth edge anchor and a direction associated with an intra directional mode used to code the coding block; and
   partition coding block into a first partition and a second partition based on the depth edge location, wherein the corresponding plurality of color samples in the coding block are predicted based on the partition.

7. The video decoding device of claim 1, wherein the processor is further configured to:
   obtain, based on the depth information, a depth edge location in the coding block;
   identify a first partition of the coding block and a second partition of the coding block based on the edge location;
   obtain a first plurality of depth sample values associated with a first plurality of depth samples in the first partition;
   predict a plurality of color sample values associated with a plurality of color samples in the first partition based on the first plurality of depth sample values;
   obtain a second plurality of depth sample values associated with a second plurality of depth samples in the second partition; and
   predict a second plurality of color sample values associated with a second plurality of color samples in the second partition based on the second plurality of depth sample values.

8. The video decoding device of claim 7, wherein the plurality of color sample values associated with the plurality of color samples in the first partition is predicted using a first cross-component linear model (CCLM), and wherein the plurality of color sample values associated with the plurality of color samples in the second partition is predicted using a second CCLM.

9. The method of claim 8, wherein the JDCC enabled indication is a block-level JDCC enabled indication.

10. The method of claim 8, wherein the determination that the JDCC mode is used for the coding block is based on a JDCC enabled indication associated with the coding block, a prediction mode associated with coding depth information for the coding block, and a prediction mode associated with coding color information for the coding block.

11. The method of claim 8, wherein the method further comprises:
   obtaining a depth edge location in the coding block based on the depth information for the coding block;
   identifying a first partition of the coding block and a second partition of the coding block based on the depth edge location;
   determining, using decoder side intra model derivation (DIMD), a first prediction mode for the first partition based on a first set of neighboring blocks;

predicting a first plurality of color samples in the first partition based on the determined first prediction mode; and determining, using DIMD, a second prediction mode for the second partition based on a second set of neighboring blocks; and predicting a second plurality of color samples in the second partition based on the determined second prediction mode.

12. The method of claim 8, wherein the depth information comprises a depth edge anchor, and wherein the method further comprises:

obtaining a depth edge location based on the depth edge anchor and a direction associated with an intra directional mode used to code the coding block; and partitioning coding block into a first partition and a second partition based on the depth edge location, wherein the corresponding plurality of color samples in the coding block are predicted based on the partition.

13. The method of claim 8, wherein the method further comprises:

obtaining, based on the depth information, a depth edge location in the coding block;

identifying a first partition of the coding block and a second partition of the coding block based on the edge location;

obtaining a first plurality of depth sample values associated with a first plurality of depth samples in the first partition;

predicting a plurality of color sample values associated with a plurality of color samples in the first partition based on the first plurality of depth sample values;

obtaining a second plurality of depth sample values associated with a second plurality of depth samples in the second partition; and predicting a second plurality of color sample values associated with a second plurality of color samples in the second partition based on the second plurality of depth sample values.

14. The method of claim 13, wherein the plurality of color sample values associated with the plurality of color samples in the first partition is predicted using a first cross-component linear model (CCLM), and wherein the plurality of color sample values associated with the plurality of color samples in the second partition is predicted using a second CCLM.

15. A method of video decoding, comprising:

obtaining a joint depth-color coding (JDCC) enabled indication;

determining that a JDCC mode is used for a coding block;

based on the determination that the JDCC mode is used for the coding block, obtaining depth information for the coding block comprising a plurality of depth samples; and predicting, based on the plurality of depth samples, a corresponding plurality of color samples in the coding block; and decoding the coding block based on the predicted corresponding plurality of color samples in the coding block.

16. A method of video encoding, comprising determining whether to encode a coding block using a joint depth-color coding (JDCC) mode;

encoding depth information in the coding block, wherein the depth information comprises a plurality of depth samples; and based on a determination to encode the coding block using the JDCC mode, encoding a corresponding plurality of color samples in the coding block based on the depth information; and including, in video data, the encoded coding block, the depth information, and a JDCC mode enabled indication that indicates that JDCC is enabled.

17. The method of claim 16, wherein the plurality of color samples comprises at least one of a plurality of luma samples or a plurality of chroma samples.

18. The method of claim 16, wherein the method further comprises:

determining to enable the JDCC mode for at least one of a slice, a tile, a sub-picture, or a block, wherein the JDCC mode enabled indication in the video data further indicates that JDCC is enabled for the slice, tile, sub-picture, or block.

19. The method of claim 16, wherein the method further comprises:

determining a first prediction mode for coding depth information for the coding block and a second prediction mode for coding color information for the coding block, wherein the determination to use the JDCC mode to encode the coding block is based on at least one of:

the JDCC mode being enabled for the coding block;

the first prediction mode for coding depth information for the coding block being an intra directional mode;

the second prediction mode for coding color information for the coding block being an intra directional mode; or the first prediction mode for coding depth information for the coding block and the second prediction mode for coding color information for the coding block being the same prediction mode.

20. The method of claim 16, wherein the method further comprises:

based on the determination to encode the coding block using the JDCC mode, determining an edge location for partitioning the coding block; and including an indication in the video data that indicates the edge location, wherein the indication that indicates the edge location is configured to indicate an edge anchor position in a reference sample array.

* * * * *